United States Patent [19]

Lo

[11] Patent Number: 4,513,848

[45] Date of Patent: Apr. 30, 1985

[54] CLUTCH BRAKE ASSEMBLY FOR ROTARY LAWNMOWER

[75] Inventor: Ching P. Lo, Culver City, Calif.

[73] Assignee: Amerosa Enterprises, Inc., Palos Verdes Estates, Calif.

[21] Appl. No.: 273,406

[22] Filed: Jun. 15, 1981

[51] Int. Cl.³ .............................................. B60K 41/24
[52] U.S. Cl. ................................... 192/18 R; 192/52; 192/103 B; 192/105 BA
[58] Field of Search ............... 192/18 R, 17 R, 103 B, 192/105 BA, 52, 54, 12 R, 65, 35, 75, 48.7; 56/11.3, 11.7; 188/70 B

[56] References Cited

U.S. PATENT DOCUMENTS

| | | | |
|---|---|---|---|
| 319,501 | 6/1885 | McDonnell | 74/517 |
| 1,403,021 | 1/1922 | Fogal | 74/517 |
| 1,852,552 | 4/1932 | Altorfer | 192/35 |
| 2,007,766 | 7/1935 | Linder | 192/17 R |
| 2,032,066 | 2/1936 | Nieman et al. | 192/105 BA |
| 2,549,245 | 4/1951 | Shultz | 192/18 R |
| 2,771,977 | 11/1956 | Uher . | |
| 3,352,176 | 11/1967 | Brundage | 192/18 R |
| 3,363,881 | 1/1968 | Kobelt | 74/506 |
| 3,960,176 | 6/1976 | Chino et al. | 474/141 |
| 3,991,864 | 11/1976 | Muller | 192/105 BA |
| 4,041,679 | 8/1977 | Seidert . | |
| 4,044,533 | 8/1977 | Wick | 192/17 R |
| 4,145,439 | 2/1979 | Lunde . | |
| 4,205,737 | 6/1980 | Harkness . | |
| 4,213,521 | 7/1980 | Modersohn . | |
| 4,253,556 | 3/1981 | Zindler | 192/17 R |

FOREIGN PATENT DOCUMENTS

| | | | |
|---|---|---|---|
| 947768 | 1/1949 | France | 474/141 |
| 0310656 | 8/1933 | Italy | 188/70 B |
| 0449639 | 7/1936 | United Kingdom | 192/17 R |

Primary Examiner—George H. Krizmanich
Attorney, Agent, or Firm—Henry M. Bissell

[57] ABSTRACT

A clutch/brake assembly for coupling and decoupling (and simultaneously braking the rotation of) a rotary implement to a drive shaft. The clutch portion of the assembly operates in one mode during low rotational speeds of the implement and at higher rotational speeds changes modes to become a centrifugal clutch. The clutch is also torque sensitive such that when the implement is subjected to high loads and low rotational speeds, the clutch is more tightly engaged to avoid clutch slippage. The brake portion of the assembly has some components common to the clutch assembly. The brake portion is self-energized and constructed to obtain braking assistance from centrifugal force such as at high rotational speeds of the implement and is torque sensitive so that at low rotational speeds and high braking force, the braking surfaces are maintained in tight engagement.

30 Claims, 7 Drawing Figures

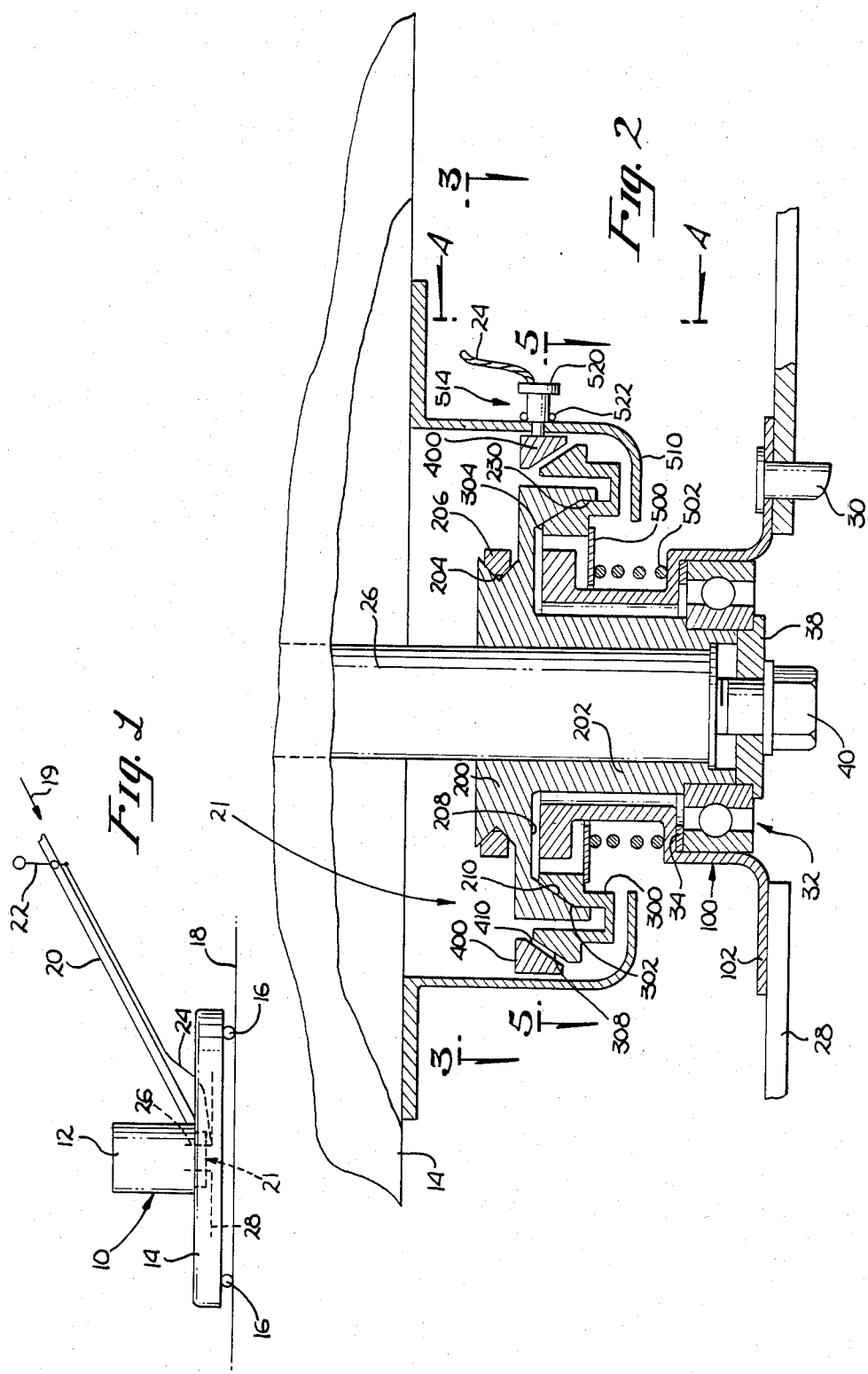

CLUTCH BRAKE ASSEMBLY FOR ROTARY LAWNMOWER

PRIOR ART STATEMENT

Applicant submits this statement in conformance with Rule 1.98 and a copy of each patent mentioned below is enclosed herewith. The closest prior art of which applicant is aware comprises the following:

| U.S. Pat. No. | Patentee | Issue Year |
| --- | --- | --- |
| 4,213,521 | Modersohn | July 1980 |
| 4,205,737 | Harkness | June 1980 |
| 4,141,439 | Lunde | February 1979 |
| 4,041,679 | Seifert | August 1979 |
| 2,771,977 | Uher | November 1956 |

Modersohn shows one form of self-energized brake and clutch assembly with the brake normally engaged and released by a "dead-man" lever.

Harkness shows one form of a clutch-brake assembly utilizing radially outwardly movable clutch elements carried by a driven clutch member. Both spring and centrifugal force cause the clutch to engage, the spring at low rotational speed, centrifugal force at higher speeds.

Lunde shows a form of self-energized brake.
Seifert shows conical clutch surfaces.
Uher also shows conical clutch surfaces.

SUMMARY OF THE INVENTION

A clutch-brake assembly for coupling and decoupling (and braking) a rotary implement to a power driven shaft. A driving clutch member (which may be referred to as a driving clutch drum or plate) is provided with a radially inwardly facing conical clutch surface which cooperates with corresponding radially outwardly facing conical clutch surfaces provided on each of a plurality of arcuate driven clutch members. The driven clutch members respond to centrifugal force to effect tighter engagement of the clutch surfaces. The clutch assembly changes operating modes at low rotational speeds (as at start-up of the blade) to allow slippage thus reducing shock and wear on the drive shaft and clutch members. Slippage also allows the flywheel (driving clutch plate) to be less massive than in prior art designs.

The driven clutch plate is constructed in segments, with each segment keyed to a hub member for rotation therewith and limited axial movement with respect to the hub. Axial movement of the radially outer segments effects the change in mode of operation of the clutch. The keyed configuration causes the clutch to be torque sensitive such that at operational speeds loading of the blade causes increased engagement of the clutch surfaces thus eliminating clutch slippage under loading.

BRIEF DESCRIPTION OF THE DRAWINGS

FIG. 1 shows a side elevation view of a representative rotary lawn mower.

FIG. 2 shows a cross sectional view of the clutch brake assembly of the present invention as it might be mounted to a lawnmower.

DETAILED DESCRIPTION OF THE INVENTION

Figure 3:
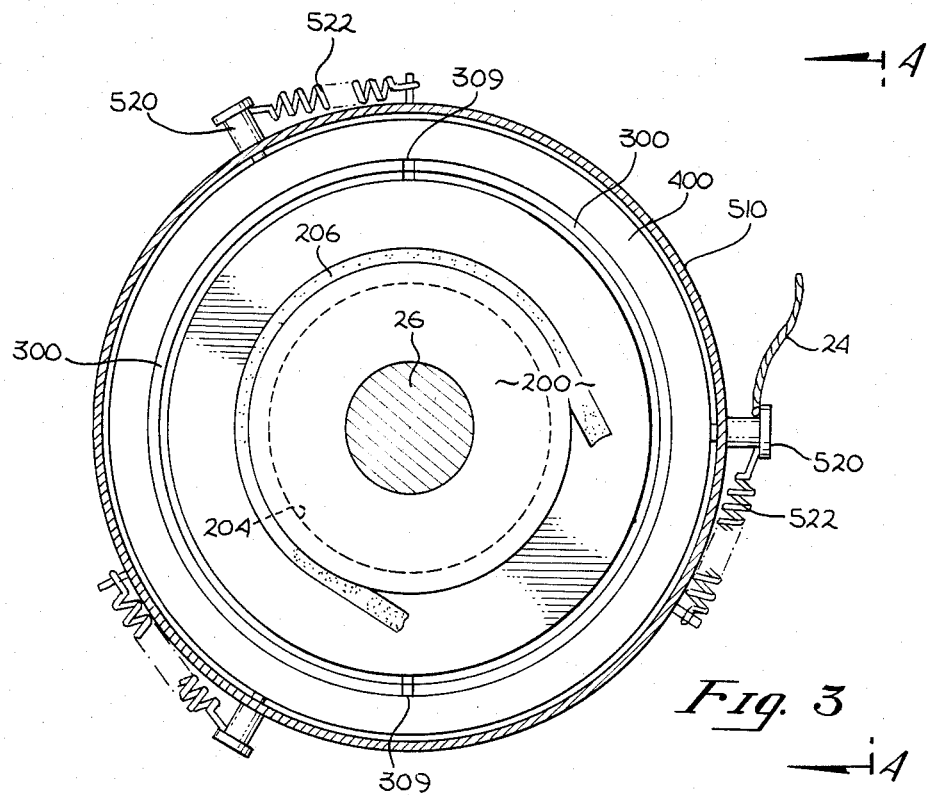
FIG. 3 is a partial sectional view of the assembly taken along the line 3—3 of FIG. 2.

A representative rotary lawnmower 10 is illustrated in FIG. 1. The lawnmower 10 comprises an engine 12 mounted upon housing 14 which is provided with wheels 16. The lawnmower may be pushed over the ground 18 by application of a force indicated by arrow 19 to handle 20 affixed to the lawnmower 10, For use in conjunction with the clutch/brake assembly 21 of the present invention, the lawnmower is provided with a dead-man switch such as lever 22 coupled to cable 24. Operation of lever 22 and cable 24 operates the clutch/brake assembly to engage or disengage the blade 28 with drive shaft 26. In the event of disengagement, the cable 24 simultaneously actuates a braking device to stop rotation of the blade 28. The clutch/brake assembly 21 and lever 22 and cable 24 are so constructed that when the operator removes his or her hands from lever 22, the clutch is automatically disengaged and the brake is automatically and simultaneously engaged to stop the rotation of the blade 28. This prevents rotation of the blade 28 of an unattended lawnmower 10 which would be a substantial safety hazard.

In the representative rotary lawnmower 10, the free end of engine drive shaft 26 extends beneath the upper portion of housing 14 and into the interior of the housing. The clutch/brake assembly 21 of the present invention is adapted to be mounted upon this free end of the drive shaft 26. The blade 28 is then mounted on a portion of the clutch/brake assembly 21 and thereby coupled to the drive shaft 26.

The clutch/brake assembly 21 includes a hub member 100 which plays an active role both when the assembly 21 is functioning as a clutch and when functioning as a brake. Depending on the role which the hub 100 is described as serving, it may be referred to as a brake hub or as a clutch hub. As shown in FIG. 2, hub 100 is provided with a flange 102 to which blade 28 may be secured such as by bolt 30 for rotation therewith. The hub 100 is suitably coupled as by a spacing washer 34 to a first half (outer half) of a bearing 32. The other half (inner half) of the bearing 32 is fixedly mounted for rotation with drive shaft 26. As shown in FIG. 2, this may be accomplished by mounting the other half of the bearing 32 upon the axial portion 202 of the driving clutch member 200. The purpose of washer 34 is merely to space the cylindrical portion of hub 100 out of contact with the inner half of bearing 32. Hub member 100 then rests upon washer 34 which is seated on the freely rotatable outer half of bearing 32. No welding or other means of firmly affixing hub 100 to washer 34 to bearing 32 is required.

The driving clutch member 200 and bearing 32 are secured upon the end of drive shaft 26 by a retaining washer 38 and bolt 40. The driving clutch member 200 may be relatively massive and serve as a clutch plate and engine flywheel. In addition, the clutch member 200 may be notched as at 204 to provide a seat for belt 206 which may be appropriately directed to drive the wheels 16 of the mower 10. This belt 206 would be operated in conjunction with its own clutch system of well known design to engage and disengage the wheels 16.

The driving clutch member 200 is provided with two clutching surfaces. The first clutching surface is the annular radially extending surface 208. Surface 208 acts as a clutch surface during the initial engagement of the clutch as more fully explained with reference to FIG. 6. Surface 208 extends radially outwardly and meets the second clutching surface 210. Surface 210 is a radially inwardly facing conical wall. Surface 210 functions as a clutching surface during high loading on the rotary implement or blade 28 and during high rotational speeds of blade 28. It is during these high loading and high rotational speeds that arcuate clutch/brake members 300 are urged radially outward so that the radially outwardly facing conical surfaces 302 engage surface 210, thereby coupling blade 28 to driving clutch member 200 as more fully explained with reference to FIG. 7. During high rotational speeds of blade 28, the arcuate clutch/brake members 300 are urged radially outwardly by centrifugal force. During high loading, they are urged radially outwardly by the interaction of the sloping surfaces 112 and 312 of the key 110 and keyway 310 respectively as described with reference to FIG. 5 below.

The arcuate brake/clutch members 300 are keyed for rotation with the hub 100 but are free for limited axial movement with respect to the hub 100. The brake/clutch members 300 are maintained in general axial alignment by washer 500 which is spring biased by spring 502 to preserve the keyed relationship of hub 100 with the members 300. The details of operation of the clutch are more fully described below.

The arcuate brake/clutch members 300 are generally U shaped in cross section. Each leg of the U is provided with a radially outwardly facing clutch surface or wall, such as surface 302 discussed above. Similar conical surfaces 308 located on the other leg of the U cooperate with an opposed corresponding parallel conical surface 410 provided on annular brake member 400 to operate as braking surfaces to stop rotation of an implement such as blade 28. The above-discussed brake/clutch assembly is mounted on the free end of the drive shaft 26 and at least partially enclosed and shielded by housing 510.

Activation of the brake/clutch assembly 21 is accomplished by means of a linkage mechanism 514 which is coupled to brake member 400 through a slot 512 in housing 510. This linkage comprises cable 24 which is actuated by operation of the lever 22. Cable 24 is coupled to pin 520 which is affixed to the brake member 400. Pin 520 rides in the helical slot 512 and is spring biased toward one end 511 of the slot 512. Operation of lever 22 causes cable 24 to move pin 520 within helical slot 512 from a first axial position to a second axial position against the bias of spring 522. This permits spring 502, pushing against washer 500, to move brake/clutch members 300 such that the radially extending surfaces 304 contact radially extending surface 208 thereby initiating coupling of blade 28 to drive shaft 26. The blade 28 then begins rotating. A more extensive explanation is given in the discussion of FIGS. 6 and 7 below. Release of lever 22 permits spring 522 to move pin 520 along the helical slot 512 such that surface 410 contacts surface 308, initiating braking and moving brake clutch members 300 downward against spring 502 thereby disengaging conical clutch surfaces 210 and 302.

While annular brake member 400 is shown in FIG. 2 as coupled to housing 510 by a single pin 520, three such pins 520 are preferably used as shown in FIG. 3. The pins 520 are equally spaced around the circumference of brake member 400 to maintain the proper axial alignment with drive shaft 26. Of course more than three such pins 520 could be used, but three is the minimum required to maintain the required axial alignment. In any event cable 24 is coupled to only one of pins 520.

Figure 5:
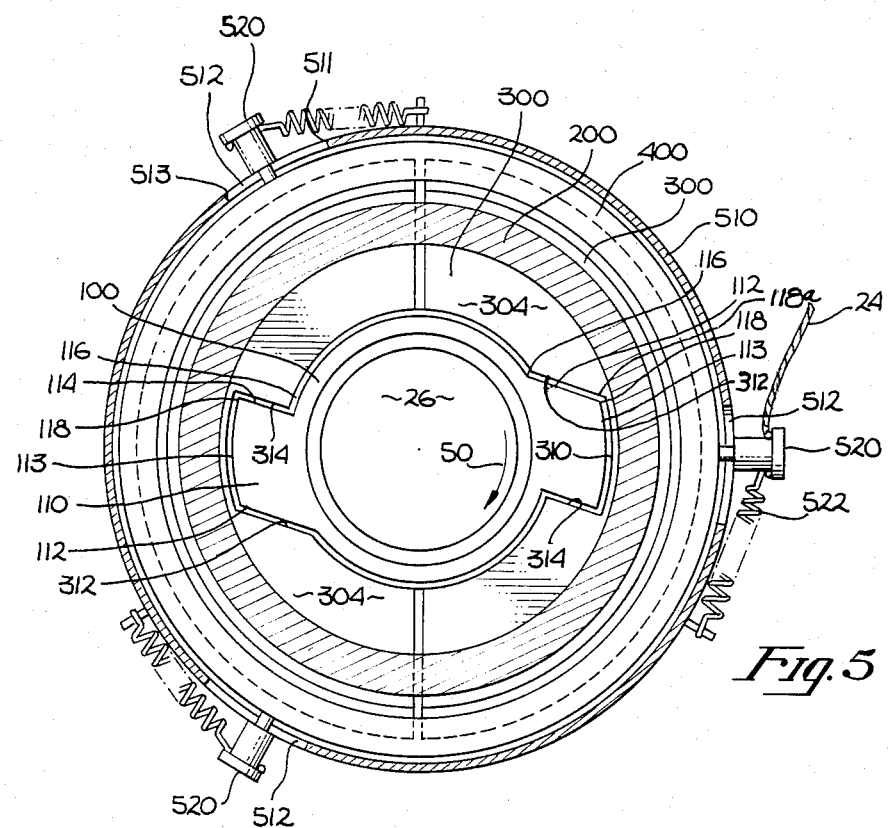
FIG. 5 is a sectional view taken along the line 5—5 of FIG. 2.

The arcuate nature of clutch members 300 is apparent in FIGS. 3 and 5. While as illustrated, only two arcuate members 300 are shown, it is readily appreciated that three or more arcuate clutch members 300 could be used provided that each was appropriately keyed for rotation with hub 100 as shown in FIG. 5. As shown in FIG. 3 each arcuate clutch member 300, visible between driving clutch member 200 and annular brake member 400, is nearly semicircular with the gap 309 between them being about 0.050 inch.

Figure 4:
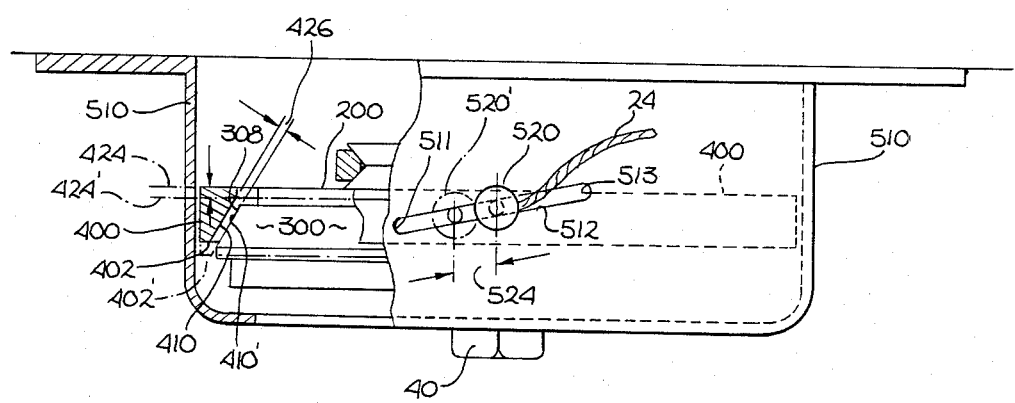
FIG. 4 is a partial section view partial side elevation view as seen from the perspective of line 4—4 of FIG. 2.

The operation of the braking portions of the clutch/brake assembly 21 is best described with reference to FIGS. 4 and 5. In the static condition with the engine 12 off, the blade 28 stopped and the dead-man stick 22 in the released position, the three springs 522 bias the three pins 520 toward end 511 of helical slots 512. Conical surface 410 is in contact with the conical surfaces 308 of the arcuate clutch members 300. The spring bias force of springs 522 is sufficient to overcome the spring bias force of spring 502 and thus the arcuate clutch members 300 are held such that the conical clutch surfaces 210 and 302 are disengaged.

Even though the engine 12 is off in the static condition, and the mower is "unattended" the blade is difficult to rotate manually because of the self-energizing feature of the brake. If, in the static condition, one attempts to rotate blade 28 in the normal rotational direction of arrow 50, the friction force between conical surfaces 308 and conical surface 410 tends to rotate annular brake member 400 in the same direction. This effectively assists springs 522 in biasing pins 520 toward ends 511 of helical slots 512 thereby increasing the engagement of the braking surfaces 308 and 410 and preventing rotation of blade 28.

The torque sensitive, self-energizing effect occurs as a result of the keyed configuration of the hub 100 and arcuate clutch member 300 as shown in FIG. 5. The hub 100 is provided with a plurality of keys 110. Because the normal direction of rotation of drive shaft 26 is in the direction of arrow 50, the keys 110 may be described as having a rotationally leading wall 114 and a rotationally trailing wall 112 joined by an axially extending end wall 113. The keys are characterized in that the rotationally trailing walls 112 are not radial but instead are sloped angularly ahead of the radial direction. That is, their radially inner end 116 rotationally trails their radially outer end 118. The keyway 314 is sized and shaped for a loose fitting relationship with the keys 110. Thus, the keyways 310 have a non-radial trailing wall 312, parallel to the corresponding trailing wall 112 of the key 110. The rotationally leading walls 314 and 114 of the keyway 310 and key 110 respectively are substantially radially oriented.

Figure 7:
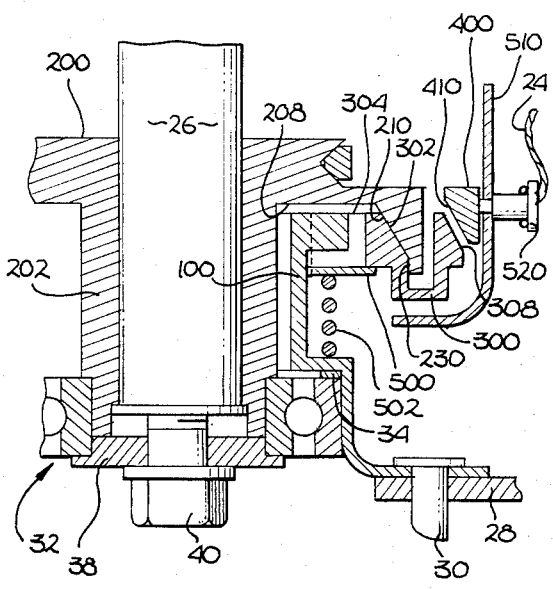
FIG. 7 shows the position of the assembly at high rotational speeds (or at low rotational speed but high loading on the rotary implement).

By reason of the above-described keyed configuration, the reaction torque of blade 28 in the direction opposite to that of arrow 50 increases the force between the surfaces 210 and 302 (FIG. 7). An attempt to so rotate the blade 28 (at any appreciable speed) would cause the rotationally trailing wall 112 to contact and slip against trailing wall 312 of the arcuate clutch members 300 thereby urging them radially outward. This in turn would urge conical braking surface 308 into tighter engagement with conical braking surface 410. Once the level of force applied to the blade 28 and transmitted back to the arcuate clutch members 300 exceeds the frictional force between brake surfaces 410 and 308, the blade 28 could be rotated contrary to its normal direction of rotation, since the self-energizing brake mechanism would be not operative in that direction of rotation. Of course, at initial clutch engagement, such as at zero rotational speed of the blade and with the brake disengaged, the blade may initially be rotated rather easily contrary to its normal rotational direction. This is because in order to do so, only the spring force of spring 502 must be overcome to allow surface 304 to slip over surface 208 thus permitting rotation.

The mode of operation by which the angled surfaces of 112 and 312 coact under the application of reaction torque to drive the clutch members 300 radially outward toward increased frictional engagement between the sloped surfaces 302 and 210 is only one element of the torque sensitive, self-energizing feature of the disclosed apparatus. Another element of the torque sensitive, self-energizing feature, effective during clutch engagement in both acceleration of the blade bearing hub 100 and under load, results from the fact that the arcuate clutch members 300 may tend to rotate about a point of contact with the keys 110. Referring to FIG. 5, and considering the structure in the right half of the figure for purposes of illustration, frictional engagement between the driving clutch member 200, mounted on the drive shaft 26, and the clutch member 300 develops a moment of force applying a rotational torque relative to the point of contact between the keyway 310 and the key 110. In the configuration shown, this contact point will normally be at the point 118a, opposite the corner 118, which becomes the center of the applied moment of force. The location of the point 118a will vary along the surface 312 as the member 300 moves radially outward. This torque tends to drive the trailing edge of the clutch member 300 radially outward, thereby tending to increase the frictional engagement of the clutch member 300 with the driving clutch member 200. This effect is torque sensitive and self-energizing, in that during operation the effect is proportional to the reaction torque between the clutch member 300 and the driving clutch member 200. It will be understood that the clutch member 300 and related structure shown on the left half of FIG. 5 operate in similar fashion.

Thus, the torque sensitive, self-energizing nature of the clutch/brake assembly operates to reduce the possibility of clutch/brake assembly slippage during operation.

At very low or zero rotational speeds of blade 28 in the direction of arrow 50, the conical nature of braking surfaces 410 and 308 and the bias of springs 522 will urge the arcuate clutch members 300 to their radially inward position. Thus conical clutch surfaces 302 will be disengaged from conical clutch surface 210, but the braking surfaces 410 and 308 will be engaged and cause slight compression of spring 502.

In this condition, the engine 12 could be started without initiating rotation of the blade 28. Drive belt 206 could be engaged by separate clutch means (not shown) with wheels 16 and the lawnmower could be power driven.

Once the engine 12 has been started in the static condition, the blade 28 may be coupled to the drive shaft 26 by operation of the dead-man lever 22. When an operator squeezes dead-man lever 22, cable 24 pulls pins 520 against the bias of springs 522 toward the upper end 513 of slots 512, thereby disengaging braking surfaces 308 and 410. This allows spring 502 acting against washer 500 to move arcuate clutch members 300 toward driving clutch member 200 until surface 304 engages surface 208 of the driving clutch member. When those surfaces engage, rotational force causes arcuate clutch members 300 to rotate slightly, bringing rotationally trailing surface 312 of keyway 310 into driving engagement with rotationally trailing surface 112 of key 110. The rotational force is transmitted, even at these low rotational speeds, between the arcuate clutch members 300 and hub 100. The blade 28 thus begins to rotate with the early rotation of the arcuate clutch members 300.

Figure 6:
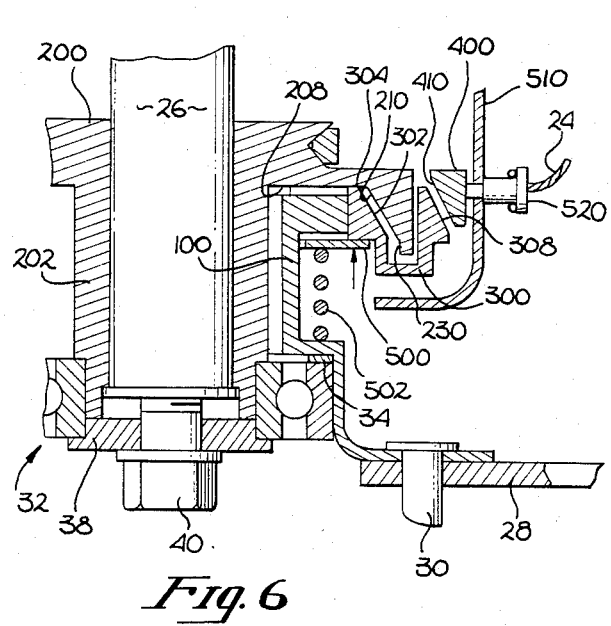
FIG. 6 is a partial cross section of the assembly showing its position at initial clutch engagement.

This position of initial clutch engagement is illustrated in FIG. 6. This illustrates the first mode of engagement of the clutch. Because this initial clutch engagement between surfaces 304 and 208 is initiated only by the force of spring 502, there may be substantial slippage between surfaces 304 and 208. This initial slippage has a number of beneficial effects. First the shock of clutch engagement is reduced, thereby reducing stress and wear in the various parts and increasing their useful life. Second, because the initial engagement force is low, it is not necessary to have a massive flywheel or driving clutch member 200. Its weight can be greatly reduced over that required in previous clutch/brake assemblies. The sloping nature of surfaces 312 and 112 allows some clutch slippage at these low rotational speeds.

As the rotational speed of the blade 28 increases, the centrifugal force acting on arcuate clutch members 300 increases, thus urging surface 304 to slide radially outwardly over surface 208. The radial sliding will continue until conical surfaces 302 contact conical surface 210. During this sliding the frictional engagement between the arcuate clutch members 300 and the driving clutch plate 200 is limited by the force of spring 502. The contact between conical surfaces 302 and 210 initiates the second mode of operation of the clutch assembly. Once conical surfaces 302 meet conical surface 210, an increase in rotational speed wil increase the level of centrifugal force acting on arcuate clutch members 300 and cause surface 302 to slip radially outwardly and axially over conical surface 210. The slipping will continue as the centrifugal force increases, causing a gradual compression of spring 502, and gradually increasing the force of engagement between conical clutch surfaces 302 and 210. The slippage will stop when conical surfaces 302 encounter the stop comprised of the axially extending surface 230. When conical surface 302 encounters the stop, the third mode of operation of the clutch assembly is initiated. From this point on, any increase in rotational speed of the blade 28 will increase the centrifugal force maintaining the engagement of conical clutch surfaces 302 and 210.

Because of the keyed configuration of the hub 100 and the arcuate clutch members 300, tight clutch engagement is maintained even at low blade rotational speeds when the blade 28 is subjected to loading. In fact, regardless of the rotational speed of the blade 28, if a load is applied to the blade 28, which would tend to slow the rotation of the blade 28, the clutch assembly 21 operates to increase the clutch engagement and substantially eliminate clutch slippage under loading at operating speeds. The clutch assembly is thus torque sensitive during low operating speeds.

For example, assume the blade 28 encounters high grass so that a high load is applied tending to slow rotation of the blade 28. The load on the blade will tend to slow rotation of hub 100 with respect to arcuate clutch members 300 and thus surface 312 of keyways 310 will contact surface 112 of keys 110. Because these surfaces are non-radial and because their radially outer ends lead their radially inner ends, the surface 312 of keyway 310 will tend to slide radially outwardly over surface 112 of keys 110. This will cause tighter engagement of conical surfaces 302 with conical surface 210, compensating for the reduction in centrifugal force (caused by the loading) and thereby prevent clutch slippage therebetween.

If for any reason the operator desires to stop rotation of the blade 28 or leaves the lawnmower 10 unattended, release of dead-man lever 22 will initiate self-energizing braking. Release of lever 22 permits springs 522 to move pins 520 toward end 511 of helical slots 512. This moves surface 410 toward and into contact with rotating surfaces 308 of the arcuate clutch members 300. When the surfaces make contact, the frictional force produced between them tends to slow rotation of blade 28. In addition, because surfaces 308 are rotating in the same direction in which the pins 520 are urged by springs 522, the frictional braking force tends to assist the springs 522 to move pins 520 toward end 511 of helical slots 512 further increasing the engagement force between the braking surfaces. The brake is thus a self energizing brake.

The brake mechanism is also a centrifugal brake in that with increased rotational speed, the clutch members 300, and hence brake surfaces 308, are urged further in the radially outward direction (subject to the limitation of stop surface 230) and will engage braking surface 410 with increased frictional force. The increase in force at high rotational speeds tends to engage the conical braking surface 410 with greater efficiency and to initiate operation of the "self energizing" portion of the brake assembly with higher force and hence more rapidly stop the blade 28.

The above-described clutch/brake assembly 21 thus exhibits, inter alia, the following advantages and features:

1. low initial clutch engaging torque to minimize stress on the parts of the assembly and increase useful life, and permitting use of a flywheel of lower mass;
2. increased clutch engagement force with increased centrifugal force, i.e., increased rotational velocity of blade;
3. increased braking force with increased rotational velocity of blades (i.e., centrifugal braking);
4. a self-energized braking system;
5. a three mode clutch system which changes with increasing rotational velocity from a traditional friction plate clutch with the added feature that it is a torque sensitive clutch, to a centrifugal clutch with limited clutch slippage to a fully centrifugal clutch;
6. a clutch assembly that will not slip at operating speeds.

While the invention has been described with reference to the preferred embodiment as illustrated in FIGS. 1-7, neither the Figures nor the description should be taken in a limiting sense. It will be readily appreciated that many changes in material and arrangement could be made by one of ordinary skill in the art to the device described herein, without departing from the spirit and scope of the invention. For example, instead of using a hub having two keys and using two keyed arcuate clutch members, a different number could be used. In addition, while the two arcuate clutch members 300, illustrated herein, together occupy nearly 360 degrees of arc, it is not necessary that the arcuate clutch members 300, regardless of the number employed, occupy nearly a full circle. Three such arcuate clutch members 300 could be used and a gap of perhaps 20 degrees could separate the three. This and other similar changes and modifications are intended to lie within the spirit and scope of the invention as defined by the appended claims.

What is claimed is:

1. A clutch assembly, for coupling and decoupling a rotary implement to a drive shaft, comprising:
   a driving clutch member fixedly mounted to said drive shaft for rotation therewith;
   a bearing having a first portion, secured for rotation with said driving clutch member and said drive shaft, and a second portion rotatable with respect to said first portion, said bearing secured against axial movement along said drive shaft;
   a driven clutch assembly and said implement mounted for rotation with said second portion of said bearing;
   said driven clutch assembly having a radially outwardly facing, combination conical wall and axial wall located radially inwardly of a corresponding and opposed radially inwardly facing combination conical wall and axial wall of said driving clutch member;
   said driven clutch assembly being responsive to centrifugal force to move radially outwardly to cause said radially outwardly facing conical wall to engage said radially inwardly facing conical wall and slide axially and outwardly along the inwardly facing conical wall until the respective axial walls are engaged;
   whereby said implement is centrifugally coupled with increasing frictional engagement for rotation with said drive shaft.

2. A clutch assembly according to claim 1 wherein said driven clutch assembly comprises:
   an annular first element fixed for rotation with said second portion of said bearing;
   a plurality of arcuate second elements, each of which is loosely keyed for rotation with said first element, each of which is provided with a portion of said radially outwardly facing conical wall, and each of which is adapted for limited axial movement with respect to said first element between a first axial position and a second axial position defined by a stop located on the radially outer portion of said radially inwardly facing conical wall of said driving clutch member; and
   resilient means for biasing said second elements toward said first axial position;
   whereby low centrifugal force causes said arcuate second elements to move radially outward such that each portion of said radially outwardly facing conical wall engages said radially inwardly facing conical wall in said first axial position and increasing centrifugal force overcomes the force of said resilient means causing said radially outwardly facing conical walls to slip axially along said radially inwardly facing conical wall toward said stop at said second axial position.

3. A clutch assembly according to claim 2 wherein:
said driving clutch member is provided with an annular radially extending surface which meets said radially inwardly facing conical surface;
said resilient means comprises a spring biased annular washer positioned to restrain said arcuate second elements in rotationally keyed relationship with said first element.

4. A clutch assembly according to claim 3 wherein:
at zero or low levels of centrifugal force only said spring biases each of said arcuate second elements into contact with said annular radially extending surface of said driving clutch member thereby allowing substantial clutch slippage and providing low start-up torque to said implement.

5. A clutch assembly according to claim 2 wherein said annular first element is provided with a plurality of keys having their radially outer ends located rotationally ahead of their radially inner ends and sized for loose fitting engagement within respective keyways located on respective arcuate second elements, the keys and keyways having respective adjacent rotationally trailing surfaces oriented non-radially for transmitting torque from the second elements to the first element;
whereby even if centrifugal force is low, if a load is applied to slow rotation of said implement, the rotationally trailing surface of said keys will engage the rotationally trailing surface of said keyways and, due to the non-radial orientation of said rotationally trailing surfaces, said arcuate second elements will be urged radially outward, thus increasing the engagement force and torque transmissibility of said opposed conical surfaces above that which would otherwise be provided by said spring at low centrifugal forces and preventing clutch slippage at high rotational loading and low rotational speeds of said implement.

6. A clutch assembly according to claim 5 wherein the keyways establish points of contact with associated keys adjacent their radially outer ends about which torque is developed in response to reaction torque encountered in operation to increase the frictional engagement of a trailing portion of the arcuate second elements with the driving clutch member.

7. A brake assembly for braking rotation of a rotary implement coupled through a clutch to a drive shaft, said brake assembly comprising:
an annular first brake member moveable between a first axial position and a second axial position and provided with a radially inwardly facing conical wall;
a plurality of arcuate second brake members also moveable between a first axial position and a second axial position, and responsive to centrifugal force to move radially outward with increased centrifugal force and provided with a radially outwardly facing conical wall parallel to and opposing said radially inwardly facing conical wall;
means for controlling movement of said annular first brake member between said first and second axial positions;
movement of said first brake member from said second axial position toward said first axial position causing said radially inwardly facing conical wall to contact said plurality of radially outwardly facing conical walls, the friction force between said conical walls acting to brake rotation of said implement, said friction force increasing with increased rotational velocity of said implement.

8. A brake assembly according to claim 7 wherein said means for controlling movement comprises:
at least one pin, passing through a respective one of at least one helical slot extending from a first axial position to a second axial position and fixedly secured to said annular first brake member;
means for biasing said pin toward said first axial position;
linkage coupled to said at least one pin for manual operation to overcome said means for biasing and to urge said pin to move within said helical slot from said first axial position to said second axial position;
release of said linkage permitting said means for biasing to urge said pin in said helical slot toward said first axial position, causing said annular first brake member to encounter said plurality of arcuate second brake elements, the rotary motion of which further encourages and assists said pin to move toward said first axial position thereby increasing the braking force applied by said first brake element;
whereby said brake assembly is self-energized.

9. A clutch-brake assembly, for coupling and decoupling a rotary implement to a drive shaft and for braking rotation of same, comprising:
a driving clutch member fixedly mounted to said drive shaft for rotation therewith;
a bearing having a first portion secured for rotation with said driving clutch member and said drive shaft, and a second portion rotatable with respect to said first portion, said bearing secured against axial movement along said drive shaft;
an annular brake member moveable between a first axial position and a second axial position and provided with a radially inwardly facing conical wall;
a driven clutch-brake assembly and said rotary implement mounted for rotation with said second portion of said bearing;
said driven clutch-brake assembly having a first radially outwardly facing conical wall located radially inwardly of a corresponding and opposed radially inwardly facing conical wall of said driving clutch member, and a second radially outwardly facing conical wall juxtaposed to said radially inwardly facing conical wall of said annular brake member;
said driven clutch-brake assembly being responsive to centrifugal force to move radially outwardly to cause said first radially outwardly facing conical wall to engage said radially inwardly facing conical wall of said driving clutch member whereby said implement is centrifugally coupled for rotation with said drive shaft; and
movement of said brake member from said second axial position toward said first axial position causing said radially inwardly facing conical wall of said brake member to contact said second radially outwardly facing conical wall, the friction force between said contacting walls acting to brake rotation of said implement.

10. A clutch-brake assembly according to claim 9 wherein said driven clutch-brake assembly comprises:

an annular first element fixed for rotation with said second portion of said bearing;

a plurality of arcuate second elements each of which is loosely keyed for rotation with said first element and adapted for limited axial movement with respect to said first element between a first axial position and a second axial position;

each of said arcuate second elements being provided with a portion of said first radially outwardly facing conical wall and a portion of said second radially outwardly facing conical wall;

resilient means for biasing said second elements toward said first axial position;

whereby low centrifugal force causes said arcuate second elements to move radially outward such that each portion of said first radially outwardly facing conical wall engages said radially inwardly facing conical wall of said driving clutch member in said first axial position;

increasing centrifugal force overcomes the bias force of said resilient means causing each said portion of said first radially outwardly facing conical wall to slip axially along said radially inwardly facing conical wall toward said second axial position, and to engage said radially inwardly facing conical wall with increasing force.

11. The clutch-brake assembly according to claim 10 wherein said second axial position of said arcuate second elements is defined by a stop located on the radially outer portion of said radially inwardly facing conical wall of said driving clutch member.

12. A clutch-brake assembly according to claim 10 wherein:

said driving clutch member is further provided with an annular radially extending surface which meets said radially inwardly facing conical wall; and said resilient means comprises a spring biased annular washer positioned to restrain said arcuate second elements in rotationally keyed relationship with said first element.

13. A clutch-brake assembly according to claim 12 wherein:

at zero and low levels of centrifugal force only said spring biases each of said arcuate second elements into contact with said annular radially extending surface of said driving clutch member thereby allowing substantial clutch slippage and providing low start up torque to said implement.

14. A clutch-brake assembly according to claim 10 wherein said annular first element is provided with a plurality of keys having their radially outer ends located rotationally ahead of their radially inner ends and sized for loose fitting engagement within respective keyways located on respective arcuate second elements, the keys and keyways having respective adjacent rotationally trailing surfaces oriented non-radially for transmitting torque from the second elements to the first element;

whereby even if centrifugal force is low, if a load is applied to slow rotation of said implement, the rotationally trailing surface of said keys will engage the rotationally trailing surface of said keyways and, due to the non-radial orientation of said rotationally trailing surfaces, said arcuate second elements will be urged radially outward, thus increasing the engagement force and torque transmissibility of said clutch-brake assembly above that which would otherwise be provided by said spring at low centrifugal forces and preventing clutch slippage at high rotational loading and low rotational speeds of said implement.

15. A clutch-brake assembly according to claim 14 wherein the keyways establish points of contact with associated keys adjacent their radially outer ends about which torque is developed in response to reaction torque encountered in operation to increase the frictional engagement of a trailing portion of the arcuate second elements with the driving clutch member.

16. A clutch-brake assembly according to claim 10 further comprising means for controlling movement of said annular brake member between said first and second axial positions including:

at least one pin, passing through a respective one of at least one helical slot extending from said first axial position to said second axial position and fixedly secured to said annular brake member;

means for biasing said pin toward its said first axial position;

linkage coupled to said at least one pin for manual operation to overcome said means for biasing and to urge said pin to move within said helical slot from said first axial position to said second axial position;

release of said linkage permitting said means for biasing to urge said pin in said at least one helical slot toward said first axial position, causing said annular brake member to encounter said plurality of arcuate second elements, the rotary motion of which further encourages and assists said pin to move toward said first axial position, thereby increasing the braking force applied by said first brake element;

whereby said brake assembly is self-energized.

17. The clutch-brake assembly of claim 9 wherein said driven clutch-brake assembly is movable radially inward in response to contact between the inwardly facing conical wall of the brake member and the second radially outwardly facing conical wall to thereby disengage the first radially outwardly facing conical wall from frictional contact with the radially inwardly facing conical wall of the driving clutch member, thereby decoupling the rotary implement from the drive shaft during braking.

18. A clutch assembly, for coupling and decoupling a rotary implement to a drive shaft, comprising:

a driving clutch member fixedly mounted for rotation with said drive shaft and provided with a first radially extending annular clutch surface and a first annular conical clutch surface;

a bearing having a first portion secured for rotation with said driving clutch member and said drive shaft, and a second portion rotatable with respect to said first portion, said bearing secured against axial movement along said drive shaft;

a driven clutch assembly and said implement mounted for rotation with said second portion of said bearing;

said driven clutch assembly having a second radially extending annular clutch surface and a second annular conical clutch surface;

resilient means urging said second radially extending annular clutch surface axially toward engagement with said first radially extending annular clutch surface to provide clutch engagement at low and zero rotational speeds of said implement;

said driven clutch assembly being responsive to centrifugal force whereby said second radially extending annular clutch surface moves radially outward with respect to said first radially extending annular clutch surface causing said second conical clutch surface to engage said first conical clutch surface;

increasing centrifugal force causing said second conical clutch surface to move axially and radially outwardly with respect to said first conical clutch surface, thereby compressing said resilient means and disengaging said second radially extending annular clutch surface from said first radially extending annular clutch surface, and increasing the force of engagement between said first and second conical clutch surfaces to provide clutch engagement at high rotational speeds of said implement.

19. A clutch assembly according to claim 18 wherein said driven clutch assembly comprises:

an annular first element fixed for rotation with said second portion of said bearing;

a plurality of arcuate second elements each of which is provided with a portion of said second radially extending clutch surface and a portion of said second conical clutch surface, each of said second elements being loosely keyed to said first element for rotation therewith and adapted for limited axial movement with respect thereto.

20. A clutch assembly according to claim 19 wherein said resilient means comprises a spring biased annular washer positioned to restrain said arcuate second elements in rotationally keyed relationship with said first element.

21. A clutch assembly according to claim 20 wherein:

at zero and low levels of centrifugal force only said spring biases each of said arcuate second elements into contact with said first annular radially extending clutch surface, thereby allowing substantial clutch slippage and providing low start-up torque to said implement.

22. A clutch assembly according to claim 21 wherein said annular first element is provided with a plurality of keys having their radially outer ends located rotationally ahead of their radially inner ends and sized for loose fitting engagement within respective keyways located on respective arcuate second elements, the keys and keyways having respective adjacent rotationally trailing surfaces oriented non-radially for transmitting torque from the second elements to the first element;

whereby even if centrifugal force is low, if a load is applied to slow rotation of said implement, the rotationally trailing surface of said keys will engage the rotationally trailing surface of said keyways and, due to the non-radial orientation of said rotationally trailing surfaces, said arcuate second elements will be urged radially outward, thus increasing the engagement force and torque transmissibility of said first and second conical clutch surfaces above that which would otherwise be provided by said spring at low centrifugal forces and preventing clutch slippage at high rotational loading and low rotational speeds of said implement.

23. A clutch-brake assembly for coupling and decoupling a rotary implement to a drive shaft and for braking rotation of the implement upon decoupling from the shaft, comprising:

a driving clutch member fixedly mounted to said shaft for rotation therewith about a central axis, the driving clutch member having a radially inwardly facing conical wall;

a driven hub member bearing said rotary implement and mounted for rotation about said axis;

an annular brake member movable between a first axial position and a second axial position, the brake member being provided with a radially inwardly facing conical wall;

a plurality of arcuate elements of generally U-shaped cross-section loosely keyed for rotation with said hub member and radially movable for alternative frictional engagement with the inwardly facing conical wall of the brake member and the inwardly facing conical wall of the driving clutch member, said elements having a pair of radially outwardly facing conical walls respectively opposite said walls of said driving clutch member and said brake member, the respective pairs of facing conical walls cooperating during engagement of a pair of said walls to guide the elements into axial alignment with the member with which the elements become engaged.

24. A clutch assembly, for coupling and de-coupling a rotary implement to a drive shaft wherein the torque transmissibility of said clutch increases with increased rotational speed of said implement, the clutch assembly comprising:

a driving clutch member mounted on said drive shaft for rotation therewith;

a segmented driven clutch plate mounted for rotation with the driving clutch member and including at least two driven clutch members slidably keyed to said implement;

the driving clutch member and the driven clutch member each having at least two mating pairs of frictional clutch engaging surfaces oriented respectively in two orthogonal directions, the first pair of opposed clutch surfaces being oriented in generally radial planes and the second pair of opposed clutch surfaces being oriented generally coaxially of the drive shaft;

a spring extending about the drive shaft and aligned coaxially therewith for biasing the opposed radial plane surfaces into frictional engagement in order to transfer torque to the driven clutch members during initiation of rotation of the implement; and means for guiding the driven clutch members radially outward under the influence of centrifugal force developed by the rotation of the driven clutch members initiated by the torque transmitted by the radial plane surfaces to drive the second pair of opposed clutch surfaces into frictional engagement.

25. The clutch assembly of claim 24 wherein the guiding means comprise self-energizing means for enhancing the frictional engagement of the second pair of clutch engaging surfaces following initial engagement of the second pair of surfaces.

26. The clutch assembly of claim 25 wherein the self-energizing means comprise a plurality of keys coupled to the implement and a plurality of mating keyways in the driven clutch members, the keys having their radially outer ends located rotationally ahead of their radially inner ends and sized for loose fitting engagement within the respective keyways, the key and keyways having respective adjacent rotationally trailing surfaces oriented non-radially for transmitting torque from the driven clutch members to the implement.

27. A clutch assembly, for coupling and de-coupling a rotary implement to a drive shaft wherein the torque transmissibility of said clutch increases with increased rotational speed of said implement, the clutch assembly comprising:
   a driving clutch member mounted on said drive shaft for rotation therewith; and
   a segmented driven clutch plate mounted for rotation with the driving clutch member and including at least two driven clutch members slidably keyed to said implement and movable both axially and radially relative to the driving clutch member;
   the driving clutch member and the driven clutch members each having at least two mating pairs of frictional clutch engaging surfaces oriented respectively in two orthogonal directions, the first pair of opposed clutch surfaces being oriented in generally radial planes and the second pair of opposed clutch surfaces being oriented generally coaxially of the drive shaft, the second pair of surfaces being spaced apart from each other during initial clutch engagement and developing initial frictional engagement by radially outward movement of the driven members resulting from centrifugal force.

28. The clutch assembly of claim 27 further including means for transferring torque from the driving clutch member to the driven clutch members prior to the second pair of surfaces coming into frictional engagement.

29. The clutch assembly of claim 28 wherein the torque transferring means is effective to permit substantial slippage between said radial plane surfaces during initiation of rotation of the implement.

30. The clutch assembly of claim 29 wherein the torque transferring means includes a spring extending about the drive shaft and aligned coaxially therewith for biasing the opposed radial plane surfaces into frictional engagement in order to transfer torque to the driven clutch members during initiation of rotation of the implement.

* * * * *